United States Patent
Bostbarge

(10) Patent No.: US 7,093,513 B2
(45) Date of Patent: Aug. 22, 2006

(54) DIFFERENTIAL SIDE GEAR AND THE PRODUCTION METHOD THEREOF

(75) Inventor: Guy Bostbarge, Domerat (FR)

(73) Assignee: Ateliers Mecaniques et Industries Speciales, Montlucon (FR)

( * ) Notice: Subject to any disclaimer, the term of this patent is extended or adjusted under 35 U.S.C. 154(b) by 206 days.

(21) Appl. No.: 10/474,997

(22) PCT Filed: Jan. 16, 2003

(86) PCT No.: PCT/FR03/00136

§ 371 (c)(1),
(2), (4) Date: Oct. 17, 2003

(87) PCT Pub. No.: WO03/060351

PCT Pub. Date: Jul. 24, 2003

(65) Prior Publication Data

US 2004/0206151 A1    Oct. 21, 2004

(30) Foreign Application Priority Data

Jan. 16, 2002   (FR)  .................................. 02 00496

(51) Int. Cl.
*F16H 1/14*   (2006.01)
*B21D 31/00*  (2006.01)
*B21D 22/00*  (2006.01)

(52) U.S. Cl. .................... 74/424; 72/377; 29/893.34

(58) Field of Classification Search ............. 29/893.34, 29/894.362; 72/359, 355.6, 354.6, 354.8, 72/267, 377; 74/451, 424

See application file for complete search history.

(56) References Cited

U.S. PATENT DOCUMENTS

| | | | | |
|---|---|---|---|---|
| 3,780,413 A | * | 12/1973 | Burgdorf | ................... 29/893.3 |
| 4,245,491 A | * | 1/1981 | Kondo et al. | ................. 72/254 |
| 4,590,782 A | * | 5/1986 | Leykamm et al. | ......... 72/354.8 |
| 4,666,665 A | * | 5/1987 | Hornsby et al. | .............. 419/48 |

* cited by examiner

*Primary Examiner*—Derris H. Banks
*Assistant Examiner*—Debra Wolfe
(74) *Attorney, Agent, or Firm*—Dowell & Dowell, P.C.

(57) ABSTRACT

A one piece extruded differential side gear comprising internal splines which are used to connect to a drive shaft. The differential side gear includes outer circular gear teeth and defines a rectilinear blind hole in which an end portion of the drive shaft is received. The circular gear teeth and the blind hole are coaxially oriented along an axis of the differential side gear.

5 Claims, 1 Drawing Sheet

DIFFERENTIAL SIDE GEAR AND THE PRODUCTION METHOD THEREOF

BACKGROUND OF THE INVENTION

1. Field of the Invention

The present invention relates to a differential side gear, as well as to a method for producing such a side gear.

2. Brief Description of the Related Art

Within the meaning which is understood here, the shell of a differential is the rigid structure in which are mounted the side and pinion gears of this differential. In operation, it receives the movement that the differential has for its function to distribute between drive shafts, and it rotates on itself.

In the majority of automotive vehicles, the power of the drive motor is transmitted to the driving wheels via a gear box and a differential. It is known to mount the differential inside the gear box, and to ensure that the shell of this differential does not completely envelop the side and pinion gears, the expression "lantern wheel differential" being commonly employed to designate this type of differential. Consequently, like the gears of the gear box, the differential and its side and pinion gears dip in oil that is contained in the gear box.

In order to avoid the gear box losing oil, each side gear may be mounted, by means of a tight bearing, in a wall of the casing. In that case, it is important that the side gears are also tight. An axial passage for a drive shaft opens at the two ends of each of the side gears, so that these gears are able to be traversed on either side by a pin that is used to remove material so as to form internal splines for connection of the drive shaft. Consequently, a closure wall is mounted at one end of the passage of each side gear, whose tightness is thus ensured.

However, when side gears are produced in large quantities in this manner, there are always a few that are not sufficiently tight.

SUMMARY OF THE INVENTION

The invention, which intends to overcome this drawback, therefore has for its purpose to propose a side gear which is more reliable in terms of tightness than the one which has just been described.

To that end, the invention has for its object a differential side gear that is provided with internal splines for connection of a drive shaft and outer circular gear teeth. The side gear is formed in one piece and defines a rectilinear blind hole for housing and connecting an end portion of the drive shaft. The circular gear teeth and the blind hole are coaxial and centered on an axis of rotation of the side gear.

The invention also has for its object a method for producing a side gear as defined hereinabove, characterized in that it comprises a step in which the splines are formed by axially engaging in said blind hole an internal die, comprising as many radial teeth as there are splines to be made.

BRIEF DESCRIPTION OF THE DRAWINGS

The invention will be readily understood on reading the following description, given by way of example and made with reference to the accompanying FIG. 1, which is a view in axial section of a side gear according to the invention.

This side gear P is essentially symmetrical with respect to its axis of rotation X–X'. It comprises a tubular portion 1 which extends in a radial ring 2. The periphery of this radial ring 2 presents the form of conical gear teeth 3, arranged in a circle symmetrical with respect to the axis of rotation X–X'.

Figure 1:
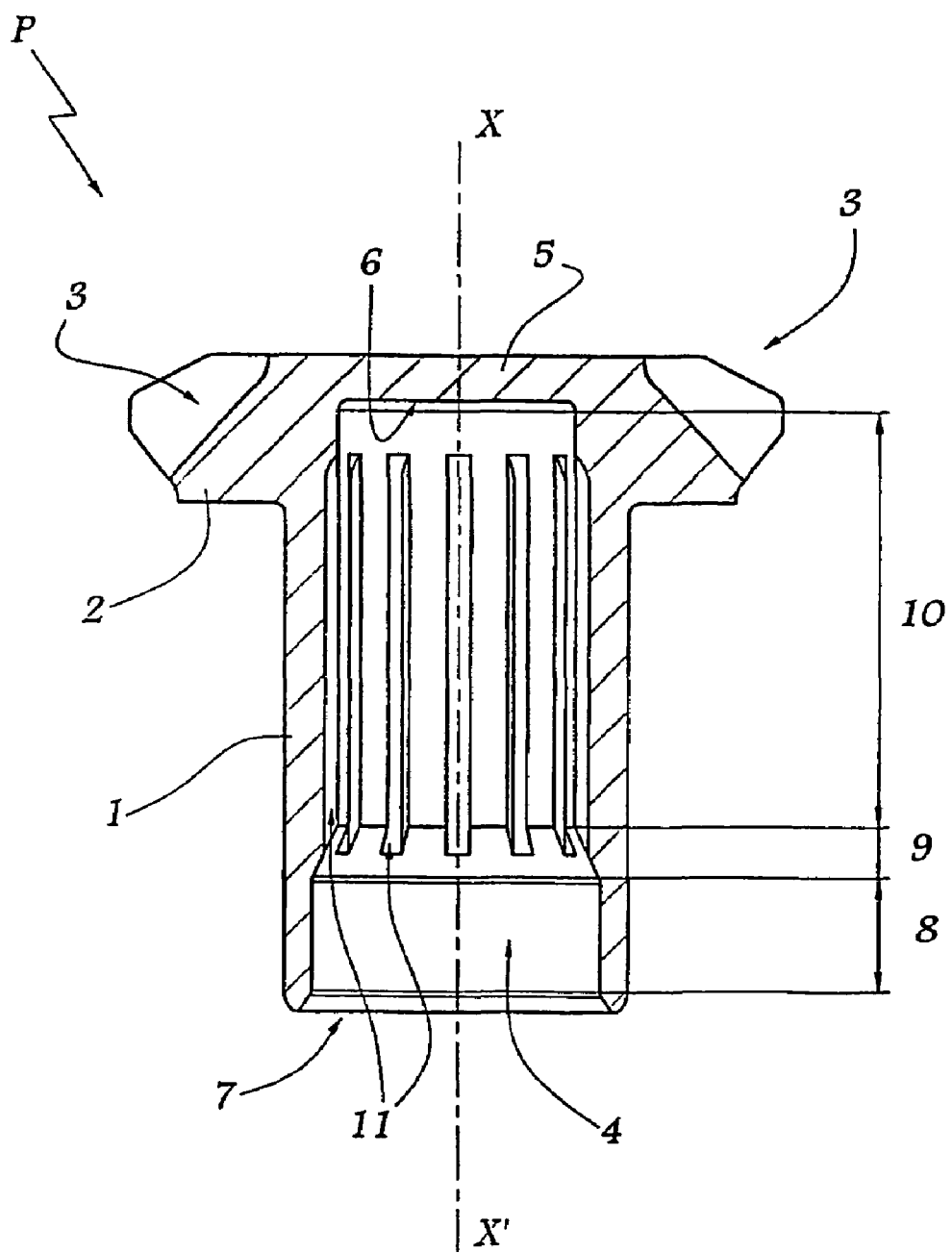

The tubular portion 1 partially defines a blind hole 4. The latter extends in the radial ring 2 before reaching a radial end wall 5 which defines its bottom 6. From its opening 7, the blind hole 4 successively comprises a cylindrical portion 8, a connecting or truncated convergent portion 9, and a substantially cylindrical portion 10. Internal splines 11 are regularly distributed around the axis of rotation X–X', and are formed in the side gear P and extend axially over a major part of the length of the portion 10, in which the splined end portion of a drive shaft (not shown) is intended to be housed, with reduced clearance, so as to couple with the side gear P. The portion 10 and the circular gear teeth 3 are thus coaxial and centered on the axis of rotation x–x'.

The side gear P is a single forged piece. The splines 11 are likewise forged. More precisely, they are extruded, i.e. obtained with the aid of an internal die (not shown), driven axially in the portion 10, towards the bottom 6, then withdrawn in the other direction. This internal die, which comprises as many radial teeth as there are splines 11 to be made, therefore makes a return journey, which renders the extrusion of the splines 11 compatible with the presence of the radial wall 5 forming obturator. Such is not the case in the known use of a pin for hollowing out by machining the splines of the side gear of the prior art, described in the preamble.

Moreover, the extruded splines are more robust than those obtained by machining.

Among the advantages of the invention, it will be noted that the side gear P which has just been described is simpler than the side gear of the prior art, described in the preamble. In particular, it comprises only one part to be manufactured, managed and stored, while the side gear of the prior art presents at least one more, namely the added obturator.

In addition, the tightness of the obturation of the passage in the side gear of the prior art is obtained only by a very precise machining of that portion of this passage in which the added obturator is mounted. Moreover, this part has a particular shape, intended to retain the obturator. The invention eliminates all these constraints, as well as another one, namely the necessity of effecting a check of the tightness of each side gear produced.

The invention claimed is:

1. A differential side gear for connection to a drive shaft, the differential side gear comprising, a tubular portion (1) integrally formed at one end thereof with a radial ring (2), said radial ring having a plurality of outer circular gear teeth (3) extending from a periphery thereof, a rectilinear blind hole (4) for housing and connecting an end portion of the drive shaft formed in said tubular portion and extending from an open end (7) of said tubular portion toward said radial ring, said blind hole including a plurality of extruded internal splines (11) formed in an internal wall of said tubular portion for engaging the drive shaft, said outer circular gear teeth and said blind hole being coaxial and centered on an axis of rotation (X–X') of the side gear.

2. The side gear according to claim 1, wherein said radial ring (2) includes a planar end wall (5) that extends outwardly to said circular gear teeth (3).

3. The side gear according to claim 1, wherein said blind hole (4) includes a bottom (6) that is located within said radial ring (2).

4. The side gear according to claim 1, wherein said blind hole (4) includes a first cylindrical portion (8) extending from said open end (7) that merges with a truncated convergent portion (9) that merges with a second cylindrical portion (10), and said splines (11) extending along said second cylindrical portion.

5. A method for producing a side gear according to claim 1, including a step in which the splines (11) are formed by axially engaging in said blind hole (4) an internal die that includes as many radial teeth as there are splines (11) to be made including inserting the internal die from the open end (7) toward a bottom (6) of the blind hole (4) and thereafter extruding the splines as the internal die is drawn outwardly of said blind hole.

* * * * *